US009312746B2

(12) United States Patent　　　(10) Patent No.: US 9,312,746 B2
Choi　　　(45) Date of Patent: Apr. 12, 2016

(54) SWITCHING TECHNIQUES TO REDUCE CURRENT OVERSHOOT IN A DC TO DC CONVERTER

(75) Inventor: Hangseok Choi, Bedford, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 805 days.

(21) Appl. No.: 13/453,042

(22) Filed: Apr. 23, 2012

(65) Prior Publication Data

US 2012/0287679 A1　Nov. 15, 2012

Related U.S. Application Data

(60) Provisional application No. 61/478,731, filed on Apr. 25, 2011.

(51) Int. Cl.
*H02M 3/335*　(2006.01)
*H02M 1/36*　(2007.01)
*H02M 1/00*　(2007.01)

(52) U.S. Cl.
CPC ............ H02M 1/36 (2013.01); H02M 3/33569 (2013.01); H02M 3/33523 (2013.01); *H02M 2001/0058* (2013.01); *Y02B 70/1433* (2013.01); *Y02B 70/1491* (2013.01)

(58) Field of Classification Search
USPC ......................... 363/15, 16, 22, 24, 25, 26, 49
See application file for complete search history.

(56) References Cited

U.S. PATENT DOCUMENTS

| | | | | |
|---|---|---|---|---|
| 5,640,313 | A * | 6/1997 | Takehara et al. | 363/97 |
| 5,995,381 | A * | 11/1999 | Wakamatsu | 363/16 |
| 6,018,467 | A * | 1/2000 | Majid et al. | 363/16 |
| 6,154,375 | A * | 11/2000 | Majid et al. | 363/16 |
| 6,288,524 | B1 | 9/2001 | Tsujimoto | |
| 6,937,483 | B2 * | 8/2005 | Zhu et al. | 363/17 |
| 7,099,163 | B1 | 8/2006 | Ying | |
| 7,313,004 | B1 * | 12/2007 | Yang et al. | 363/21.02 |
| 7,375,987 | B2 * | 5/2008 | Kyono | 363/21.02 |
| 7,733,669 | B2 * | 6/2010 | Jiao et al. | 363/16 |

(Continued)

FOREIGN PATENT DOCUMENTS

| | | |
|---|---|---|
| CN | 101741233 | 6/2010 |
| CN | 101895201 | 11/2010 |

(Continued)

OTHER PUBLICATIONS

L6599 High-voltage resonant controller, STMicroelectronics, Feb. 2009, 36 pages, Rev 3.

*Primary Examiner* — Nguyen Tran

(74) *Attorney, Agent, or Firm* — Grossman Tucker Perreault & Pfleger PLLC

(57) ABSTRACT

A DC/DC converter system includes gate control circuitry, a transformer, a second stage, and soft start control circuitry. The gate control circuitry is configured to generate a first and a second gate control signal configured to open and close first and second switches of an inverter circuitry, respectively, to generate an AC signal from a DC input signal. The transformer transforms the AC signal and the second stage rectifies the AC signal to a DC output signal. The soft start control circuitry generates a signal to delay a closing of the first switch during an initial portion (Td) of a first cycle of the first switch. A method of soft-starting a DC/DC converter includes generating first and second gate control signals and delaying closing of the first switch during Td.

16 Claims, 4 Drawing Sheets

(56) References Cited

U.S. PATENT DOCUMENTS

| | | | |
|---|---|---|---|
| 7,755,914 B2* | 7/2010 | Telefus et al. | 363/16 |
| 7,773,398 B2* | 8/2010 | Kyono | 363/127 |
| 8,018,740 B2* | 9/2011 | Sun et al. | 363/16 |
| 8,085,558 B2* | 12/2011 | Choi | 363/21.02 |
| 8,605,462 B2* | 12/2013 | Yang | 363/21.02 |
| 2003/0026112 A1* | 2/2003 | Winick et al. | 363/24 |
| 2007/0263421 A1* | 11/2007 | Kyono | 363/127 |
| 2008/0247194 A1* | 10/2008 | Ying et al. | 363/17 |
| 2009/0196074 A1 | 8/2009 | Choi | |
| 2009/0251926 A1* | 10/2009 | Choi et al. | 363/16 |
| 2011/0062782 A1* | 3/2011 | Coley et al. | 307/43 |
| 2011/0128758 A1* | 6/2011 | Ueno et al. | 363/17 |
| 2011/0157927 A1* | 6/2011 | Adragna et al. | 363/26 |
| 2011/0267844 A1* | 11/2011 | He | H02M 3/33592 363/21.02 |

FOREIGN PATENT DOCUMENTS

| | | |
|---|---|---|
| TW | 538587 | 6/2003 |
| TW | 200828769 | 7/2008 |

* cited by examiner

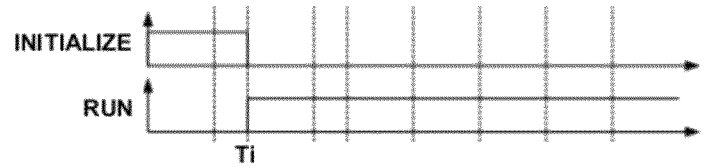
FIG. 2
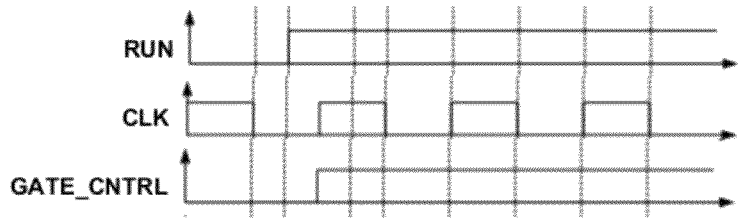
FIG. 3
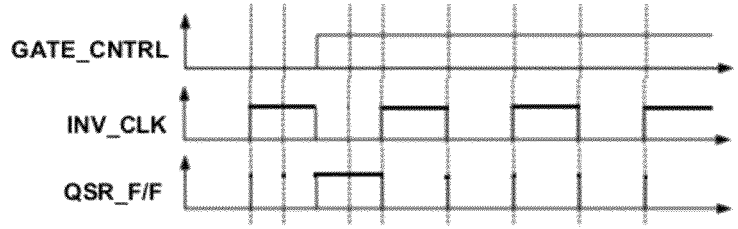
FIG. 4
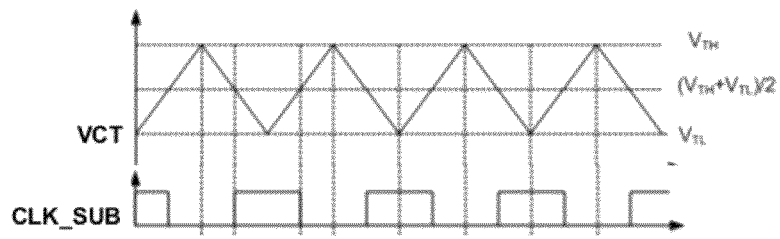
FIG. 5
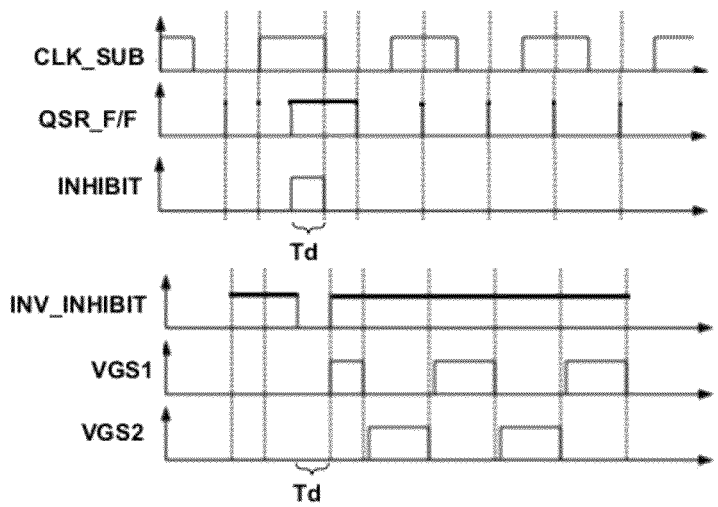
FIG. 6
FIG. 7

SWITCHING TECHNIQUES TO REDUCE CURRENT OVERSHOOT IN A DC TO DC CONVERTER

CROSS REFERENCE TO RELATED APPLICATIONS

This application claims the benefit of U.S. Provisional patent application Ser. No. 61/478,731 filed Apr. 25, 2011, the entire disclosure of which is incorporated herein by reference.

FIELD

The present disclosure relates to a DC/DC converter system, and more particularly, to synchronous rectifier control techniques for a resonant converter.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIGS. 2-7 illustrate timing diagrams of various signals consistent with one embodiment of the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure provides controlling techniques for a DC to DC converter during a soft start operation. In one control technique, an inhibit gate control signal (INHIBIT) is generated for controlling, at least in part, the conduction state of one of the switches (Q1) of the inverter portion of the DC to DC converter during startup. In particular, the INHIBIT signal is asserted during an initial portion (Td) of the first switching cycle of switch Q1 to cause switch Q1 to remain open during the first cycle longer than otherwise dictated by the gate control circuitry. As a result, the INHIBIT signal reduces the duty cycle of switch Q1 only during the first cycle of the switch Q1, which reduces current overshoot of the DC to DC converter upon startup.

In one embodiment, the INHIBIT signal is generated based on the charging/discharging of a PFM capacitor (PFMcap), a clock signal (CLK), and a run signal (RUN). For example, the INHIBIT signal is generated by ANDing the CLK_SUB signal with the QSR_F/F signal. The CLK_SUB signal is based on the charging/discharging of PFMcap. The QSR_F/F signal is based on the CLK signal, RUN signal, and inverted clock signal (INV_CLK).

Figure 1:
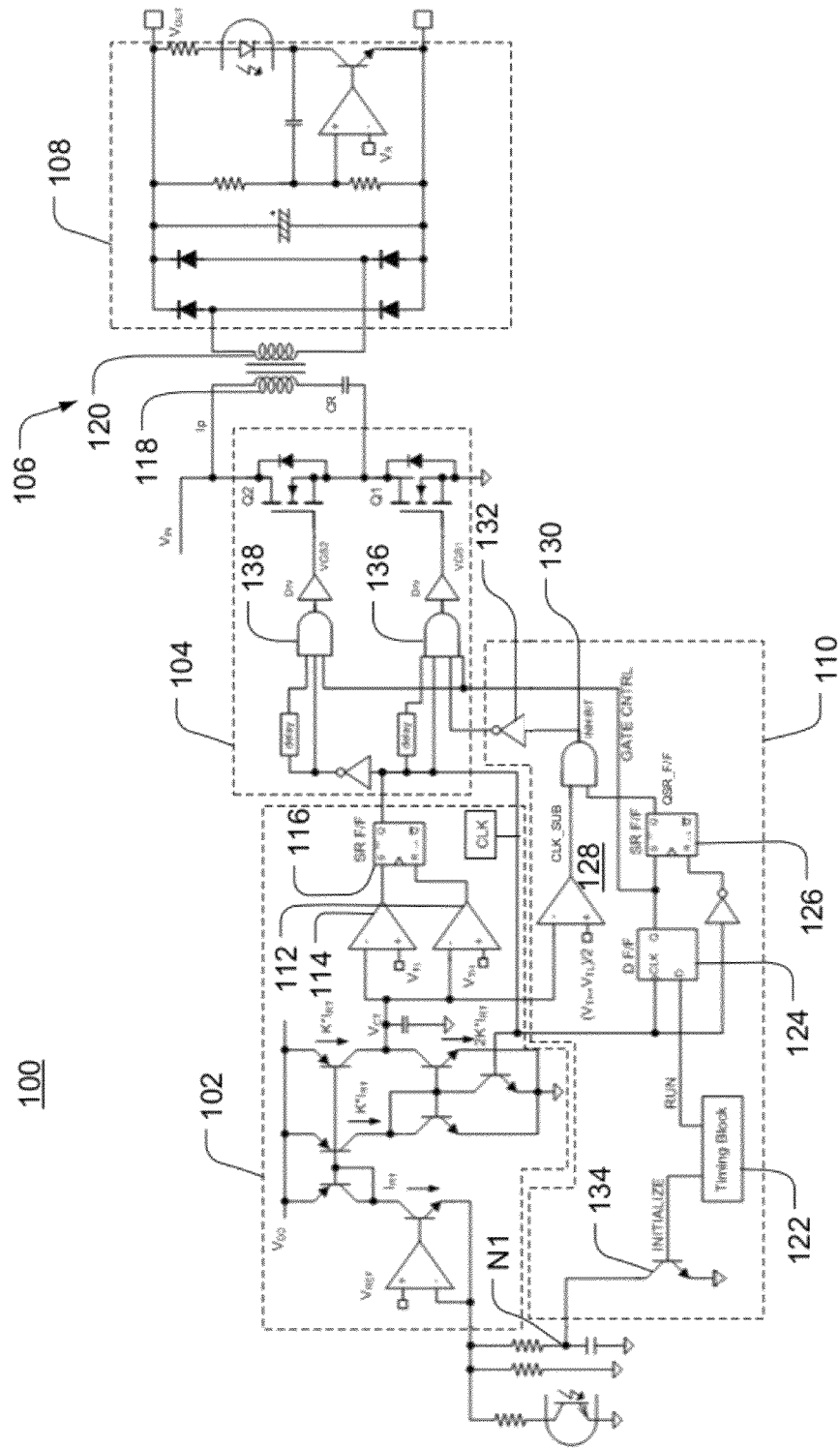
FIG. 1 illustrates a DC to DC converter system consistent with various embodiments of the present disclosure.

Turning now to FIG. 1, one embodiment of a DC/DC converter system 100 consistent with various embodiments of the present disclosure is generally illustrated. The DC/DC converter 100 includes current controlled oscillator circuitry 102, gate control circuitry 104, transformer circuitry 106, secondary stage circuitry 108, and soft start control circuitry 110. The DC/DC converter system 100 is configured to receive an input DC voltage (Vin) and generate an output DC voltage (Vout). Generally, the gain of the DC/DC converter system 100 may be controlled by the switching frequency (fs) of the switches Q1 and Q2 in relation to the resonant frequency (f0) of the DC/DC converter system 100.

The current controlled oscillator circuitry 102 is configured to sequentially charge and discharge a pulse frequency modulated capacitor (PFMcap) such that the voltage (VCT) of PFMcap oscillates between a high voltage threshold (VTH) and a low voltage threshold (VTL), for example, as represented by a triangular waveform. The width of VCT is configured to change based on feedback information of Vout as explained herein. A first and a second comparator 112, 114 compare VCT against VTH and VTL, respectively. The output of these comparators 112, 114 sets and resets the Q output of the SR flip-flop 116, thereby creating a square waveform signal.

The gate control circuitry 104 includes inverter circuitry having a first and a second switch Q1, Q2. Gate control circuitry 104 is also configured to generate a first and a second gate control signal (VGS1 and VGS2, respectively) based at least in part, on the square waveform signal from the current controlled circuitry 102. The gate control signals VGS1, VGS2 are configured to open/close switches Q1 and Q2, respectively, thereby controlling the charging/discharging of the resonance capacitor CR of the transformer circuitry 106. Vout may be used as feedback to the current controlled oscillator circuitry 102, where Vout is compared to a reference voltage signal (Vref) to obtain a constant (or nearly constant) output voltage Vout. The duty cycle (in PWM mode) or frequency (in PFM mode) of the gate drive signals VSG1, VSG2 are, generally, determined by the intersection of the voltage on PFMcap with the reference signal Vref.

During start up of a DC/DC converter, the current Ip on the primary side of the transformer circuitry 106 (e.g., the resonant tank circuit) may spike. More specifically, since the resonant capacitor CR is initially discharged, a very narrow ON time is required for switch Q1 during initial switching to prevent overshoot of the resonant current Ip. The overshoot of the primary side current Ip can trip the over current protection circuitry (if one is provided) and/or cause audible noise. While the overshoot can sometimes be managed using a high initial switching frequency, the high initial switching frequency may create a high burden on the oscillator design which can result in the oscillator design being very complex, expensive, and/or occupy a significant amount of circuit board space.

Consistent with at least one embodiment of the present disclosure, the soft start control circuitry 110 is configured to reduce and/or eliminate current overshoot in the DC/DC converter system 100 without incurring the high demands on the oscillator design. Generally, the soft start control circuitry 110 is configured to generate an INHIBIT signal (and ultimately an inverted INHIBIT signal as discussed herein) which, when received by the gate control circuitry 104, is configured to delay the closing of switch Q1 during an initial portion Td of the first cycle of switch Q1, thereby reducing the duty cycle of switch Q1 only during the first cycle. As a result, the oscillator may be configured to operate at a lower initial operating frequency during start up compared to other techniques (e.g., but not limited to, the normal operating frequency of the oscillator during start up), thereby reducing the burden on the oscillator design while also reducing and/or eliminating overshoot of the current Ip.

More specifically, the soft start control circuitry 110 includes a timing block 122, a first flip-flop 124, a second flip-flop 126, a comparator 128, an AND gate 130, and an inverter 132. The following description should be read in light of FIGS. 2-7 which illustrate timing diagrams of various signals discussed in FIG. 1. Upon start up, the timing block 122 is configured to generate an INITIALIZE signal (FIG. 2) for a predetermined amount of time Ti. The INITIALIZE signal closes switch 134 to pull down voltage at node N1 to generate sample of feedback voltage condition. After Ti, the timing block 122 stops generating INITIALIZE and starts generating a RUN signal. The first flip-flop 124 (e.g., a D flip-flop) is configured to generate a GATE_CNTRL signal (FIG. 3) based on the RUN signal and a CLK signal from CLK. More specifically, the first flip-flop 124 is latched HIGH when both the RUN and CLK signals are HIGH.

The second flip-flop 126 (e.g., a SR flip-flop) is configured to generate a QSR_F/F signal based on the GATE_CNTRL and an inverted clock signal INV_CLK (which is the inverse of the CLK signal). The QSR_F/F signal is a square signal having a high value during the first period of the switch Q1, and thereafter latched low. More specifically, the QSR_F/F signal is generated when the GATE_CNTRL signal rises and is latched low when INV_CLK signal rises (FIG. 4).

The comparator 128 is configured to generate a CLK_SUB signal based on VCT (from PFMcap) and the average of VTH and VTL (i.e., (VTH+VTL)/2). For example, VCT and (VTH+VTL)/2 are received at the inverting and non-inverting input of the comparator 128, respectively. When the VCT is less than (VTH+VTL)/2, the output of comparator 128 goes high to generate the CLK_SUB signal (FIG. 5).

The AND GATE 130 is configured to generate the INHIBIT signal based on the CLK_SUB signal and QSR_F/F signal. The INHIBIT signal is HIGH only during an initial portion Td of the first cycle of switch Q1. For example, AND GATE 130 is configured to generate the INHIBIT signal when both CLK_SUB signal and QSR_F/F signal are HIGH. Because QSR_F/F signal is only HIGH during the first clock cycle of switch Q1, INHIBIT is only HIGH during Td. The INHIBIT signal is received by the inverter 132. The inverter 132 is configured to generate the INV_INHIBIT signal by inverting the INHIBIT signal. The INV_INHIBIT signal is therefore HIGH at all times except during Td (at which point INV_INHIBIT is LOW).

Gate control circuitry 104 receives INV_INHIBIT and is configured to delay the closing of switch Q1 during Td (i.e., INV_INHIBIT is asserted during Td to cause switch Q1 to remain open during Td longer than otherwise dictated by gate control circuitry 104), thereby reducing the duty cycle of switch Q1 during the first cycle of switch Q1 and reducing and/or eliminating overshoot of the primary side current Ip. For example, gate control circuitry 104 includes a first AND gate 136 associated with the first switch Q1 and a second AND gate 138 associated with the second switch Q2. The first AND gate 136 is configured to receive the output signal of the SR flip-flop 116, a brake-before-make signal (based on the output signal of the SR flip-flop 116), the GATE_CNTRL signal, and the INV_INHIBIT signal. Because the INV_INHIBIT signal is LOW during Td, the output of the first AND gate 136 is LOW, and switch Q1 remains open during Td. By adjusting the width of the INV_INHIBIT signal, the delay in closing switch Q1 (i.e., how long switch Q1 remains open during the initial portion of the first cycle of switch Q1) may be adjusted.

Because the INV_INHIBIT signal is remains HIGH after Td, one or more of the remaining signals (i.e., the output signal of the SR flip-flop 116, a brake-before-make signal, and the GATE_CNTRL signal) to the first AND gate 136 control the operation of switch Q1 after Td. As such, switch Q1 operates normally during all times except during Td, during which time switch Q1 is remains open as a result of the INHIBIT signal generated by the soft start control circuitry 110. Accordingly, the soft start control circuitry 110 is configured to reduce the duty cycle of switch Q1 only during the first cycle of switch Q1, thereby reducing and/or eliminating overshoot of the primary side current Ip upon startup.

Figure 8:
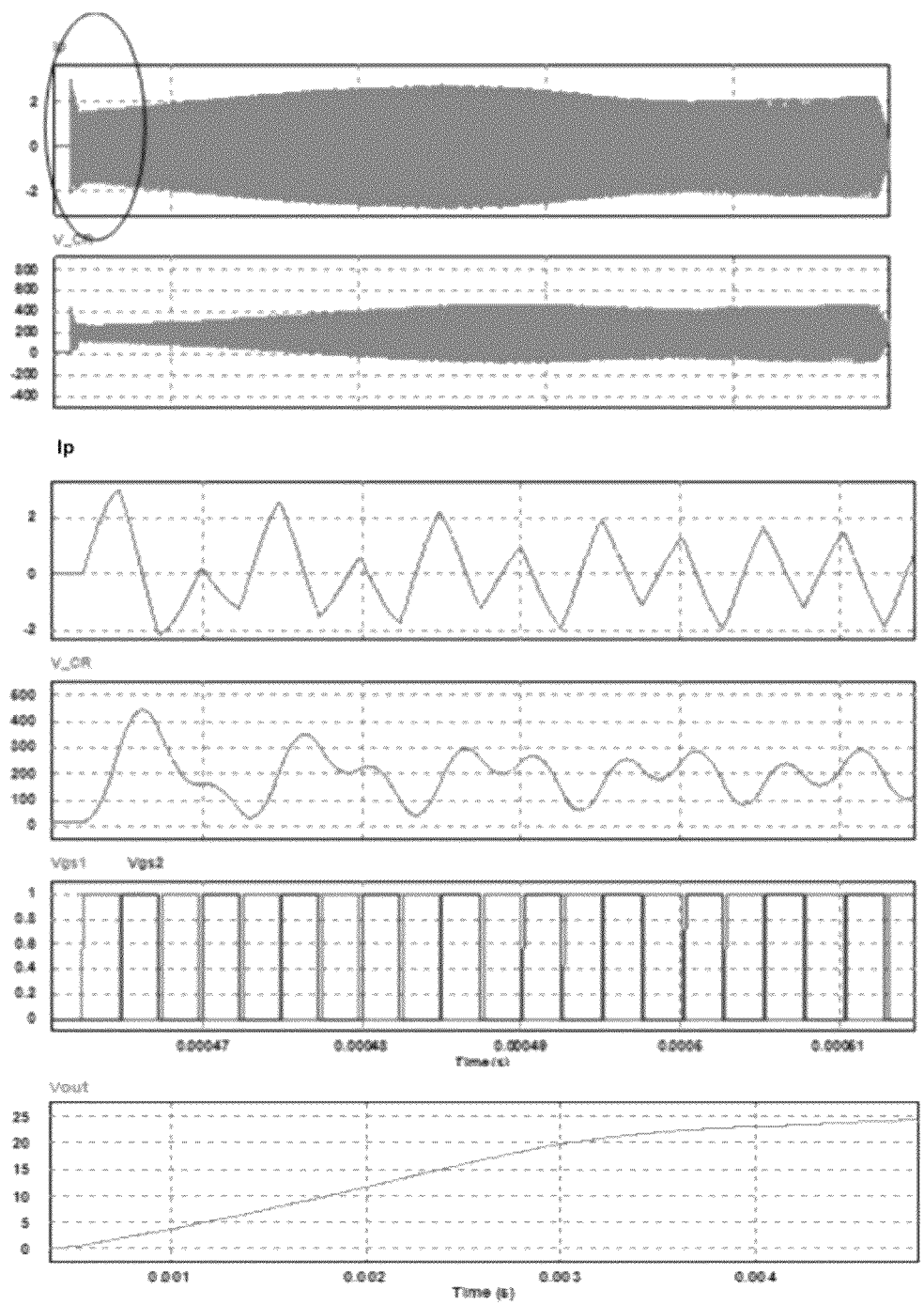
FIG. 8 illustrates various operational parameters associated with known DC to DC converters during startup.

Turning now to FIG. 8, several diagrams consistent with a known DC-DC converter having an initial frequency during start up of 200 kHz is generally illustrated. As can be seen, the width of VGS1 and VGS2 is substantially constant over time. As a result, the primary side current Ip spikes (see the circled region) to approximately +3 and the voltage of resonant capacitor CR spikes to over approximately 400. Additionally, the output voltage Vout of the DC/DC converter begins to rise almost immediately upon startup.

Figure 9:
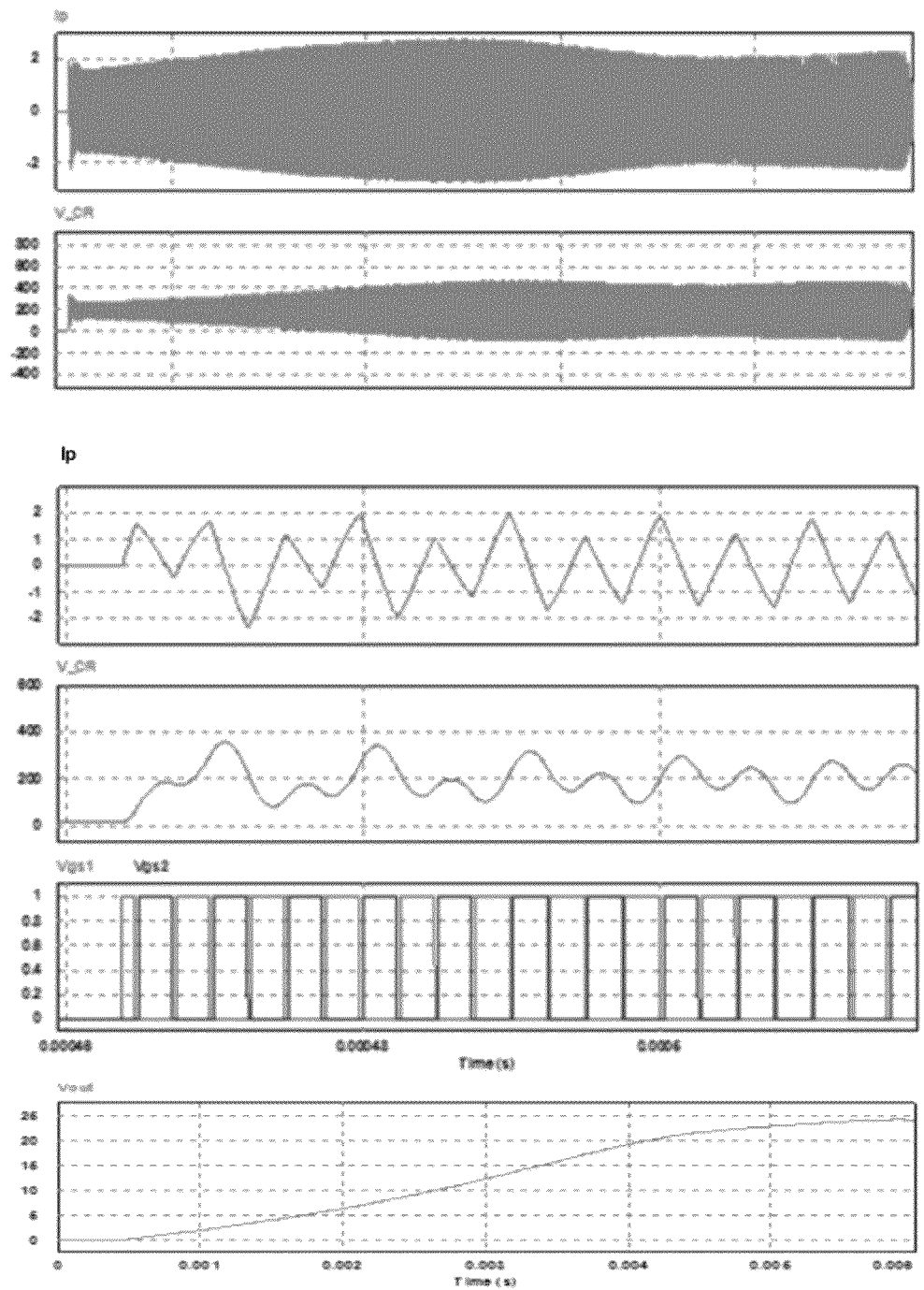
FIG. 9 illustrates various operations parameters associated with a DC to DC converter consistent with the present disclosure during startup.

In contrast, several diagrams consistent with the DC/DC converter 100 of the present disclosure are generally illustrated in FIG. 9. Similar to FIG. 8, the DC/DC converter 100 of FIG. 9 also has an initial operating frequency of 200 kHz. Turning initially to the diagram illustrating VGS1 and VGS2, it may be seen that VGS1 has a reduced width (i.e., reduced duty cycle) during the first cycle of switch Q1 compared to VGS1 in FIG. 8. Additionally, the primary side current Ip in FIG. 9 only reaches +2 and the voltage of resonant capacitor CR only reaches approximately 300. The output voltage Vout of the DC/DC converter 100 does not begin to rise to 0.0005 seconds upon startup. Accordingly, the soft start circuitry 110 consistent with the present disclosure reduces The term "switches" may be embodied as MOSFET switches (e.g. individual NMOS and PMOS elements), BJT switches and/or other switching circuits known in the art. In addition, "circuitry" or "circuit", as used in any embodiment herein, may comprise, for example, singly or in any combination, hardwired circuitry, programmable circuitry, state machine circuitry, and/or circuitry that is included in a larger system, for example, elements that may be included in an integrated circuit.

According to one aspect, the present disclosure may feature a DC to DC converter system including gate control circuitry, a transformer, a second stage, and soft start control circuitry. The gate control circuitry includes inverter circuitry having a first and a second switch. The gate control circuitry further configured to generate a first and a second gate control signals configured to open and close the first and the second switch, respectively, and generate an AC signal from a DC input signal. The transformer is configured to transform the AC signal and the second stage configured to rectify the AC signal to a DC output signal. The soft start control circuitry is configured to generate a signal to delay a closing of the first switch during an initial portion (Td) of a first cycle of the first switch.

According to another aspect, the present disclosure may feature a method of soft-starting a DC to DC converter. The method includes generating a first and a second gate control signal configured to open and close a first and a second switch of an inverter circuitry, respectively; and delaying a closing of the first switch during an initial portion (Td) of a first cycle of the first switch.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A DC to DC converter system, comprising:
   gate control circuitry including inverter circuitry having a first and a second switch, the gate control circuitry further configured to generate a first and a second gate control signals configured to open and close the first and the second switch, respectively, and generate an AC signal from a DC input signal;
   a transformer configured to transform the AC signal;
   a second stage configured to rectify the AC signal to a DC output signal;
   current controlled oscillator circuitry configured to sequentially charge and discharge a pulse frequency modulated capacitor (PFMcap) such that the voltage (VCT) of PFMcap oscillated between a high voltage threshold (VTH) and a low voltage threshold (VTL) in a triangular waveform; and
   soft start control circuitry configured to generate a signal to delay a closing of the first switch during an initial portion (Td) of a first cycle of the first switch based on the VCT signal, a clock signal (CLK), and a run signal (RUN), the soft start control circuitry including a timing block configured to generate an initialization signal (INITIALIZE) for a predetermined amount of time (Ti) upon startup of the DC to DC converter system, the timing block further configured to generate the RUN signal after Ti.

2. The DC to DC converter system of claim 1, wherein the soft start control circuitry further comprises a first flip-flop configured to generate a GATE_CNTRL signal based on the RUN signal and the CLK signal.

3. The DC to DC converter system of claim 2, wherein the first flip-flop comprises a D flip-flop configured to be latched HIGH when both the RUN and the CLK signals are HIGH.

4. The DC to DC converter system of claim 2, wherein the soft start control circuitry further comprises a second flip-flop configured to generate a QSR_F/F signal based on the GATE_CNTRL and an inverted clock signal (INV_CLK).

5. The DC to DC converter system of claim 4, wherein the second flip-flop comprises a SR flip-flop configured to generate the QSR_F/F signal when the GATE_CNTRL signal rises and is latched low when INV_CLK signal rises.

6. The DC to DC converter system of claim 4, wherein the QSR_F/F signal is a square signal having a high value during the first period of the first switch, and thereafter latched low.

7. The DC to DC converter system of claim 4, wherein the soft start control circuitry further comprises a comparator configured to generate a CLK_SUB signal based on the VCT signal and (VTH+VTL)/2.

8. The DC to DC converter system of claim 7, wherein VCT and (VTH+VTL)/2 are received at the inverting and non-inverting input of the comparator, respectively, and wherein an output of comparator goes high to generate the CLK_SUB signal when the VCT signal is less than (VTH+VTL)/2.

9. The DC to DC converter system of claim 7, wherein the soft start control circuitry further comprises an AND gate configured to generate an INHIBIT signal based on the CLK_SUB signal and the QSR_F/F signal, wherein the INHIBIT signal is HIGH only during the initial portion Td of the first cycle of the first switch.

10. The DC to DC converter system of claim 7, wherein an AND gate is configured to generate the INHIBIT signal when both the CLK_SUB signal and the QSR_F/F signal are HIGH, and wherein the QSR_F/F signal is only HIGH during a first clock cycle of switch Q1.

11. The DC to DC converter system of claim 9, further comprising an inverter configured to generate an INV_INHIBIT signal which is the inverse of the INHIBIT signal, the INV_INHIBIT signal being HIGH at all times except during Td at which point INV_INHIBIT is LOW.

12. The DC to DC converter system of claim 11, wherein the INV_INHIBIT signal is asserted against the gate control circuitry to delay the closing of the first switch during Td.

13. The DC to DC converter system of claim 12, wherein the gate control circuitry further comprises a first AND gate associated with the first switch, the first AND gate being configured to receive a signal from the current controlled oscillator circuitry, a brake-before-make signal, the GATE_CNTRL signal, and the INV_INHIBIT signal, wherein an output of the first gate AND is LOW during Td because the INV_INHIBIT signal is LOW during Td.

14. A method of soft-starting a DC to DC converter, the method comprising:
   generating a first and a second gate control signal configured to open and close a first and a second switch of an inverter circuitry, respectively;
   sequentially charging and discharging a pulse frequency modulated capacitor (PFMcap) such that the voltage (VCT) of PFMcap oscillates between a high voltage threshold (VTH) and a low voltage threshold (VTL) in a triangular waveform; and
   delaying a closing of the first switch during an initial portion (Td) of a first cycle of the first switch based on the VCT signal, a clock signal (CLK), and a run signal (RUN), wherein an initialization signal (INITIALIZE) is generated for a predetermined amount of time (Ti) upon startup of the DC to DC converter system, and wherein the RUN signal is generated after Ti.

15. The method of claim 14, wherein the delaying of the first switch during Td reduces the duty cycle of the first switch only during the first cycle.

16. The method of claim 15, wherein the second gate control signal controls the second switch during Td.

* * * * *